United States Patent [19]

Yano

[11] Patent Number: 4,649,946
[45] Date of Patent: Mar. 17, 1987

[54] PIPET CLEANING APPARATUS

[75] Inventor: Shozo Yano, Takatsuki, Japan

[73] Assignee: Clean Chemical Co., Osaka, Japan

[21] Appl. No.: 716,267

[22] Filed: Mar. 26, 1985

[30] Foreign Application Priority Data

Mar. 29, 1984 [JP] Japan .................................. 59-61687
Nov. 2, 1984 [JP] Japan ................................ 59-232118

[51] Int. Cl.⁴ .............................................. B08B 3/04
[52] U.S. Cl. ................................. 134/57 R; 134/113; 137/132
[58] Field of Search ................ 134/57 R, 57 D, 58 R, 134/58 D, 113; 137/132, 133, 141

[56] References Cited

U.S. PATENT DOCUMENTS 2,971,647  2/1961  Petrusek .......................... 137/132 X
3,233,448  2/1966  Brown ............................. 137/132 X
3,638,666  2/1972  Fishman ............................ 134/57 R
4,203,462  5/1980  Beller ........................... 134/57 D X Primary Examiner—Philip R. Coe
Attorney, Agent, or Firm—Jones, Tullar & Cooper

[57] ABSTRACT

A pipet cleaning apparatus in which cleaning liquid is fed into a cleaning tank, where a pipet is accommodated, through a feeding pipe line, a liquid level in the tank is raised to the full liquid level to immerse the pipet in the cleaning liquid, then the used cleaning liquid is overflown through an overflow portion of a discharging pipe line and by repeating the same process, the pipet cleaning is carried out, characterized in that the cleaning liquid is detected by a sensor at a level lower than the full liquid level by each cleaning time, the detected signal is counted by a counter, and when a preset number of cleaning times is counted, a valve of the feeding pipe line is closed.

9 Claims, 12 Drawing Figures

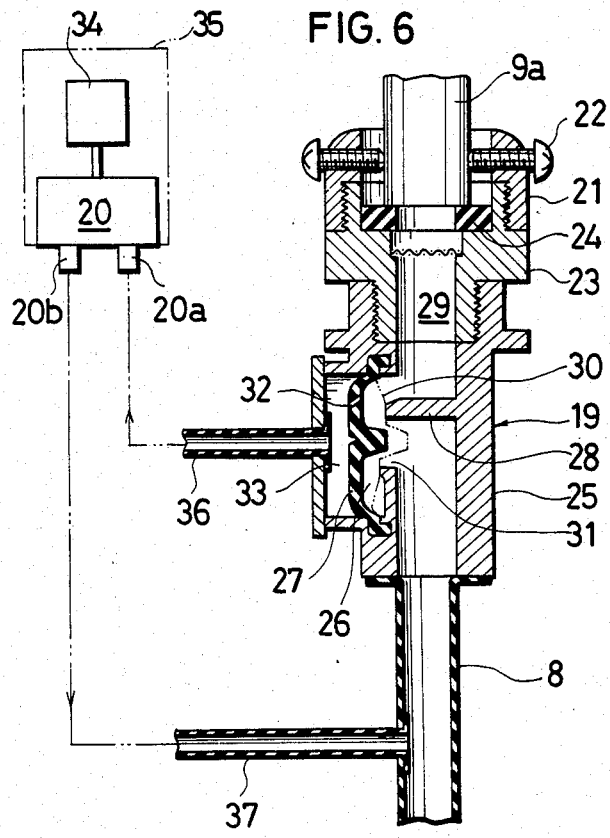
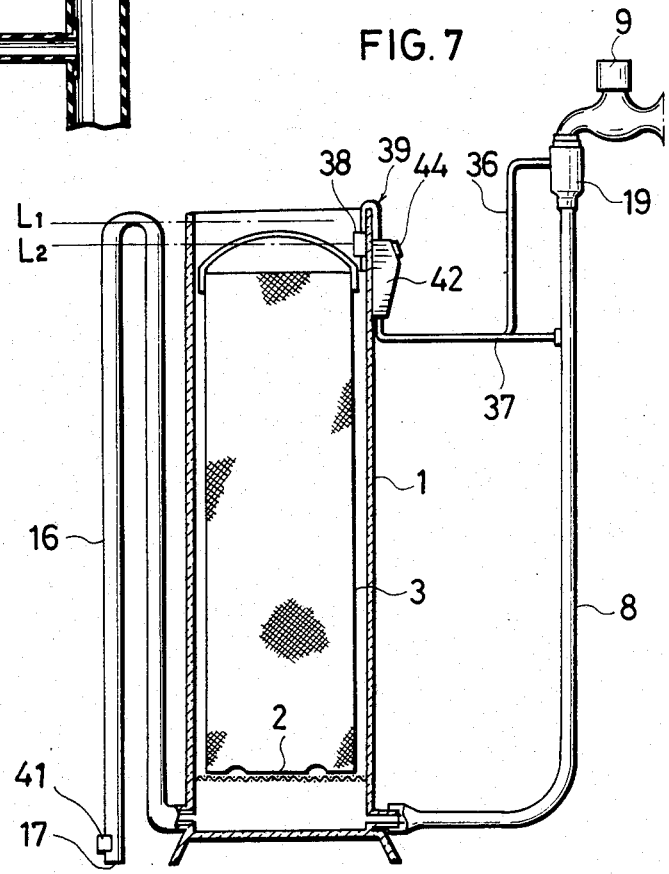

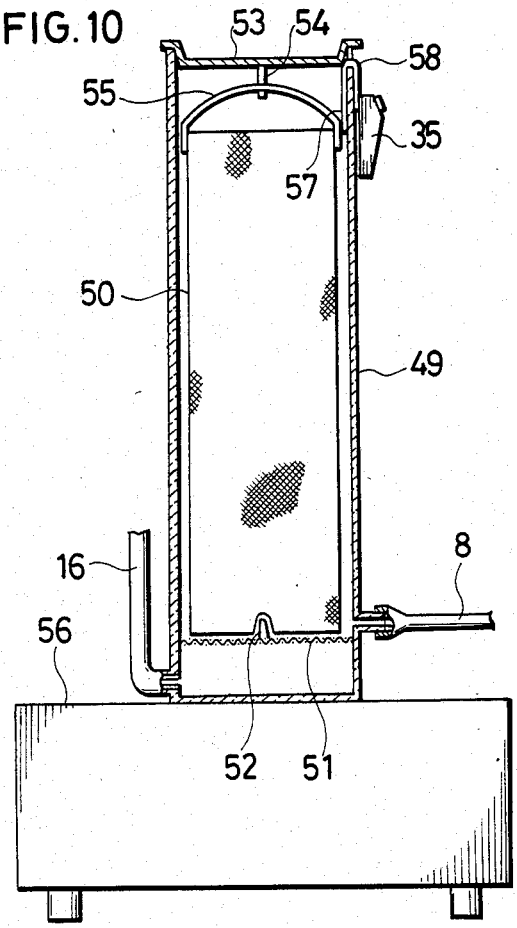
FIG. 10
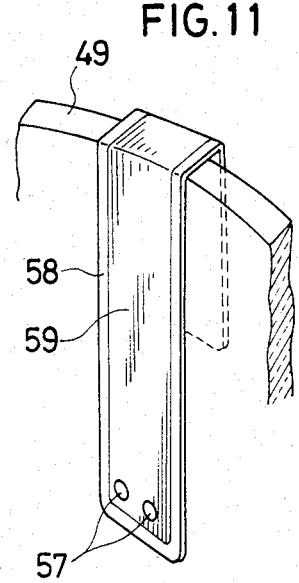
FIG. 11
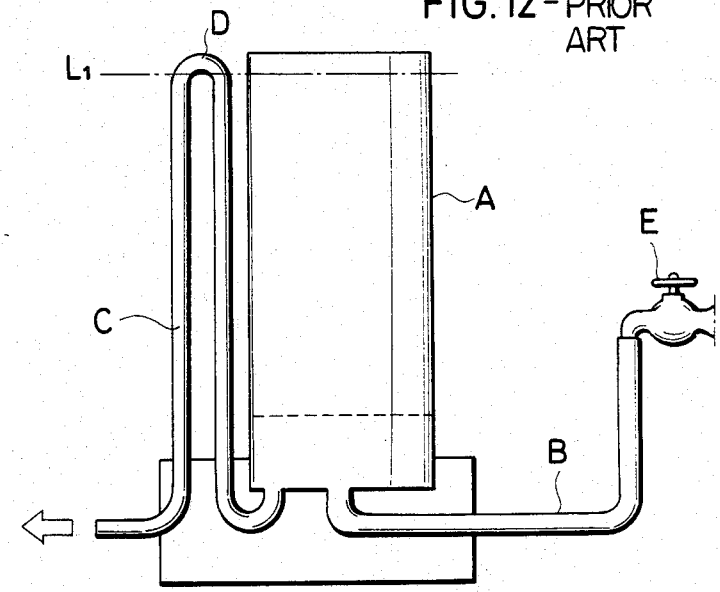
FIG. 12 – PRIOR ART

PIPET CLEANING APPARATUS

BACKGROUND OF THE INVENTION

1. Field of the Invention

This invention relates to a pipet cleaning apparatus for use in various experiments such as biological testing, chemical testing and in laboratories.

2. Description of the Prior Art

Generally, the pipet cleaning is carried out after the chemical pretreatment in a cleaning tank, and it is conventional to use a cleaning apparatus constructed as shown in FIG. 12. This known cleaning apparatus has a structure in which a pipe line B for feeding cleaning liquid and another pipe line C for discharging the used cleaning liquid (hereinafter called "waste liquid") out of a cleaning tank A are respectively connected with the cleaning tank A, and an overflow portion D of the same level as the full liquid level $L_1$ established in the cleaning tank A is formed in the discharging pipe line C.

With respect to the cleaning operation, a liquid feeding cock E is opened for feeding the cleaning liquid (water) from the pipe line B to the cleaning tank A to fill it. At the same time, the liquid level in the discharging pipe line C is raised, and as the cleaning liquid overflows through the overflow portion D when the liquid level in the tank reaches the established full liquid level $L_1$, the waste liquid flows down through the discharging pipe line C. Thus, by repeating the operation, the required number of immersion cleaning times (several or over ten times) is applied to the pipet.

In this connection, when the number of pipet cleaning times is set at ten, for example, it is necessary to stop the feed of cleaning liquid after completing the established ten times of cleaning in order to save the cleaning liquid or solvent. For that purpose, as a control system of the number of cleaning times, two kinds of systems have been proposed up to the present, i.e., a timer count type based on cleaning time corresponding to the number of cleaning times and a flow quantity count type on the basis of the used quantity of liquid corresponding to the number of cleaning times. In either of these two systems, however, the liquid level in the tank at the time of stopping the count (or the moment of completing the final cleaning) is not taken into consideration, and accordingly, there exist disvantages described hereinafter.

In case that the number of cleaning times is set at 10, for example, it is desired that at the time of completing the 10th (final) cleaning, the used cleaning liquid in the tank is still kept at the full liquid level without being discharged through the discharging pipe line C so that the pipet may still be kept immersed in the cleaning liquid. This is because it is necessary to prevent the cleaned pipet from being stuck by water spoor, dust or various germs in the air.

This requirement is not satisfied by either of the aforementioned two known control systems, because according to these systems, at the time of completing final cleaning, the liquid in the tank is drawn into the discharging pipe line C, once the liquid level in the tank reaches the full liquid level $L_1$ and the completion of cleaning comes when the tank becomes empty.

Furthermore, during repeated cleaning, even when the waste liquid is drawn into the discharging pipe line C, the new cleaning liquid is fed from the feeding pipe line B to the cleaning tank A. Accordingly, the new cleaning liquid flows into the tank while discharging with the waste liquid drawn into the discharging pipe without being used for the pipet cleaning, this results in the cleaning liquid or solvent wastage and an increase of discharging time, bringing about a cost increase in cleaning and redundancy of cycle time from cleaning to discharge.

SUMMARY OF THE INVENTION

An object of this invention is, therefore, to provide a pipet cleaning apparatus wherein the cleaning operation is automatically stopped at the time of final cleaning in the established number of cleaning times without drawing the waste liquid in the cleaning tank to the discharging pipe line while keeping the liquid level in the tank almost at the full liquid level.

Another object of this invention is to provide a pipet cleaning apparatus wherein, after completion of each cleaning, the feed of new cleaning liquid (containing cleaning solvent) to the cleaning tank is automatically stopped during the period of discharging the waste liquid from the tank to the discharging pipe line.

In order to accomplish the foregoing objects, the pipet cleaning apparatus of this invention is characterized by comprising a cleaning tank for accommodating a pipet, a pipe line for feeding cleaning liquid to the cleaning tank, a siphon-shaped pipe line for discharging used cleaning liquid out of the cleaning tank having an overflow portion at the same level as a full liquid level established in the cleaning tank, a sensor for detecting existence of the cleaning liquid immediately before the cleaning liquid reaches the full liquid level, a counter for counting signals detected by the sensor, and a valve on the feeding, pipe line to be closed by the signal which is output by the sensor when a specified number of cleaning times is counted.

According to the aforementioned pipet cleaning apparatus, since the sensor detects the completion of immersion of the pipet immediately before reaching the full liquid level and the number of cleaning times at the moment of such detection is counted, the liquid level in the tank does not reach the full liquid level as the valve is closed by the detection of the final cleaning. As a consequence, after the completion of the final cleaning, the waste liquid is not drawn out of the tank to the discharging pipe, the pipet is still kept immersed in the liquid, and therefore, there no longer exists the disadvantage that the cleaned pipet is stuck by water spoor, dust, various germs, etc.

The pipet cleaning apparatus of this invention is further characterized by comprising a cleaning tank for accommodating a pipet, a pipe line for feeding cleaning liquid to the cleaning tank, a siphone-shaped pipe line for discharging used cleaning liquid out of the cleaning tank having an overflow portion at the same level as a full liquid level established in the cleaning tank, a first sensor for detecting existence of the cleaning liquid immediately before the cleaning liquid reaches the full liquid level, a counter for counting signals detected by the first sensor, a second sensor for detecting the starting of overflow of the cleaning liquid, and a valve on the feeding pipe line to be closed by the signal which is output when a specified number of cleaning time is counted and by the signal which is detected by the second sensor respectively.

According to the aforementioned pipet cleaning apparatus, the second sensor detects that the waste liquid is discharged out of the tank to the discharging pipe line through the overflow portion after completion of each cleaning, and the valve in the feeding pipe line is closed using the detected signal so as to stop the feed of new cleaning liquid during the discharge of the waste liquid from the tank. Thus, the waste of the cleaning liquid or solvent is prevented and the cycle time from cleaning to discharge can be shortened.

Other features and advantages of this invention will become apparent in the course of the following description of the preferred embodiment with the accompanying drawings.

BRIEF DESCRIPTION OF THE DRAWINGS

In the accompanying drawings forming a part of this application, like parts are designated by common reference numerals.

FIG. 6 is an enlarged sectional view of a diaphram valve of FIG. 4;

FIG. 7 is a partial sectional view according to a third embodiment of the invention showing the outline of a pipet cleaning apparatus;

FIG. 10 is a schematic view showing one mode of use in a combination of an ultrasonic vibrating device with a cleaning tank;

FIG. 11 is an enlarged perspective view of a clip-shaped hanger of FIG. 10; and

FIG. 12 is a schematic view of a conventional pipet cleaning apparatus.

DESCRIPTION OF THE PREFERRED EMBODIMENTS

Figure 1:
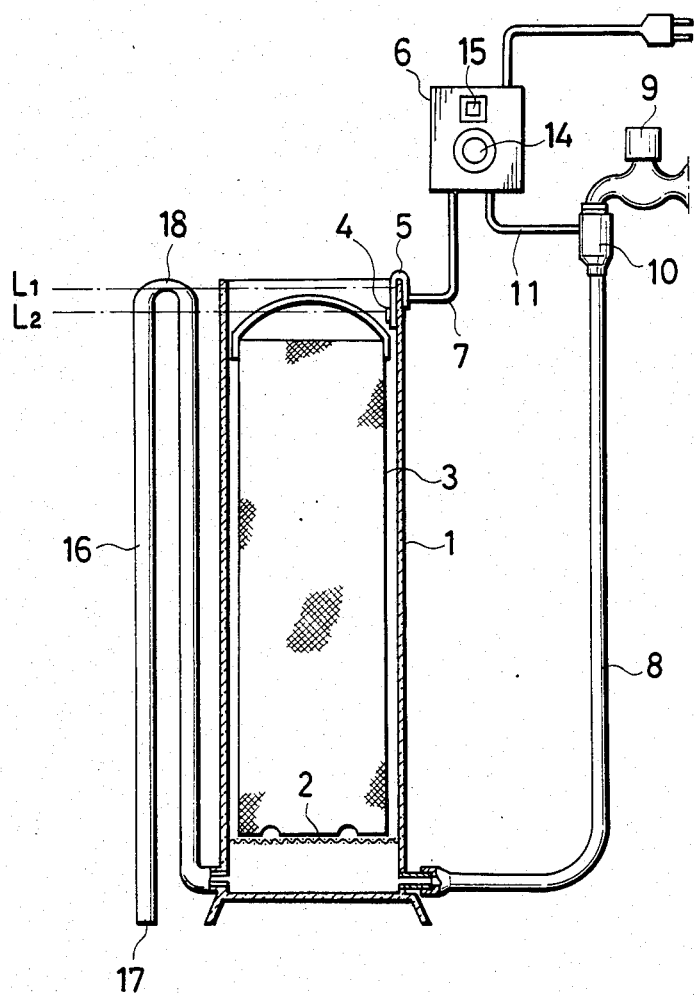
FIG. 1 is a partial sectional view according to a first embodiment of the invention showing the outline of a pipet cleaning apparatus.

The pipet cleaning apparatus of which the outline shown in FIG. 1 is equipped with a cleaning tank 1. A supporting plate 2 made of a perforated plate or a mesh member bridges the cleaning tank by extending across the tank a little above the inner bottom of the cleaning tank 1. A basket 3 is placed on the supporting plate 2.

Figure 2:
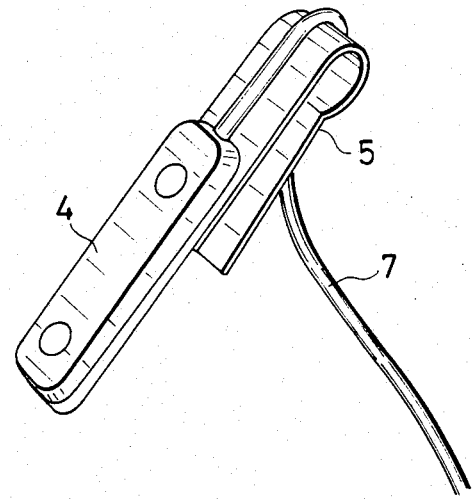
FIG. 2 is an enlarged perspective view of a chip shaped hanger.

A full liquid level $L_1$ is established near the opening of the cleaning tank 1 at a position a little above the top of the basket 3. The pipet accommodated in the basket 3 is immersed in the liquid when the liquid rises up to the full liquid level $L_1$. A liquid detection level $L_2$ is established at a position a little lower than the full liquid level $L_1$ in the cleaning tank, and a sensor 4 for detecting the cleaning liquid (hereinafter called "the first sensor") is mounted at the position of the detection level $L_2$. In this case, the sensor 4 is fixed as shown in FIG. 2, to a clip-shaped hanger 5 beforehand, and thereby the sensor 4 is easily mounted and demounted by only hanging the hanger 5 on the opening edge of the cleaning tank 1.

Figure 3:
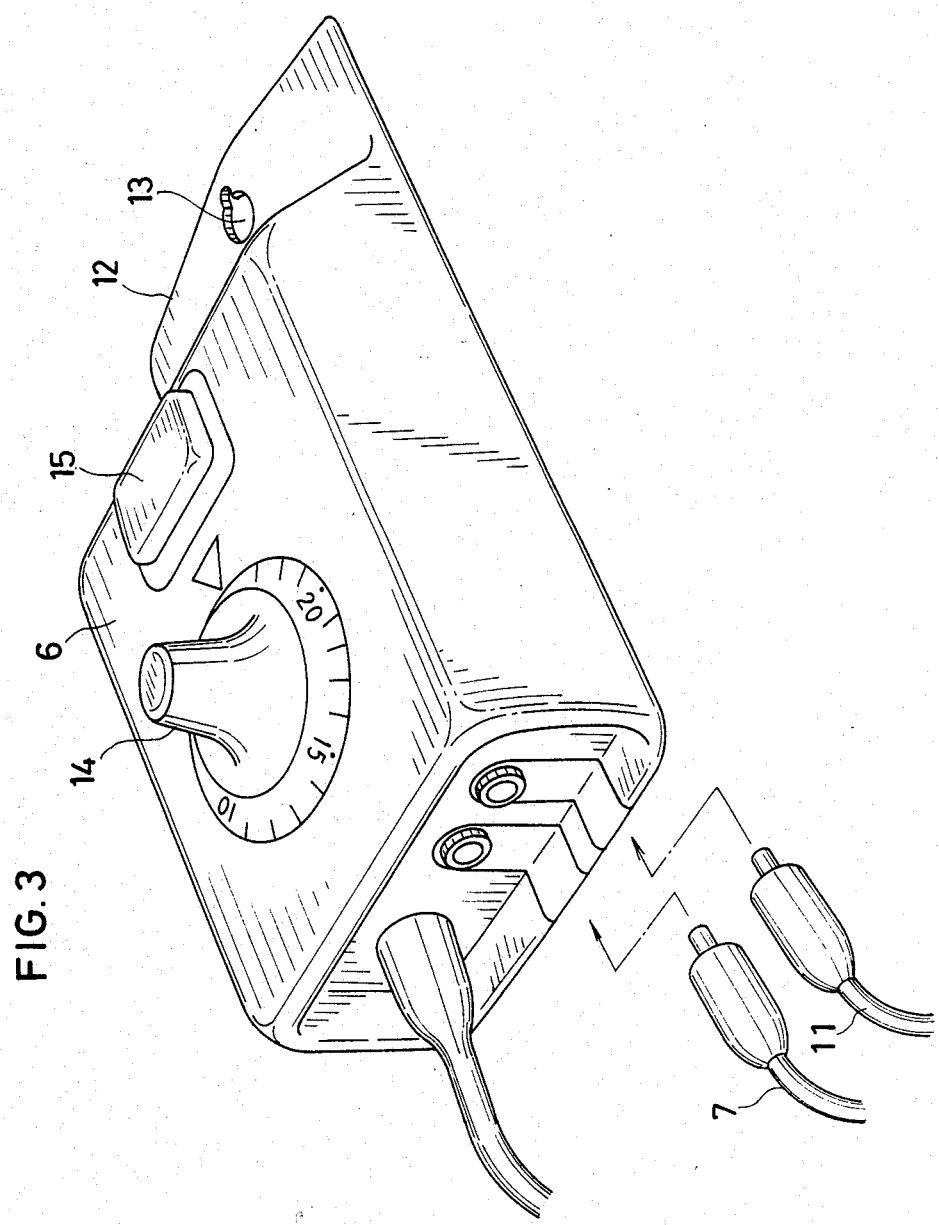
FIG. 3 is an enlarged perspective view of a control box hanger.

The sensor 4 is connected with a counter 6 by way of cord 7 as shown in FIGS. 1 and 3. Thus, the sensor 4 outputs a liquid level detection signal each time the liquid in the tank reaches the liquid detection level $L_2$, and the detected signal is transmitted to the counter 6 to be stored therein.

A feeding pipe line 8 for feeding cleaning liquid includes a feed water cock 9, and an electromagnetic valve 10 mounted on the outlet of the feed water cock 9. The electromagnetic valve 10 is connected with the counter 6 by way of a cord 11, and is switched off (closed) by the output signal from the counter 6 when the counter 6 counts a specified number of cleaning times. In this connection, it is preferred that a hole 13 is formed on a frame 12 of the counter 6 in order to hang the counter 6 in an adequate place as a wall as shown in FIG. 3. Further, a dial 14 for setting the number of the cleaning time and a stater 15 are provided on the counter 6 respectively.

An inlet of a siphon-shaped discharging pipe line 16 is connected with the bottom of the cleaning tank 1, and an outlet 17 of the discharging pipe line 16 is positioned lower than the inner bottom of the cleaning tank 1. An overflow portion 18 formed on the discharging pipe line 16 is positioned at the same level as the full liquid level $L_1$.

With regard to the operation of the foregoing pipet cleaning apparatus, in the first place the basket 3 for accommodating a pipet therein is placed on the supporting plate 2, and the number of cleaning times is set by means of the dial 14 of the counter 6.

When the starter 15 is switched "ON" and the feed water cock 9 is opened, the cleaning liquid runs through the electromagnetic valve 10 to flow into the cleaning tank 1 by way of the feeding pipe line 8. Then the liquid level in the tank increases so that the pipet may be immersed in the cleaning liquid thereby carrying out the cleaning thereof. When the liquid in the tank reaches the liquid detection level $L_z$, the sensor 4 outputs a detection signal so that a counter 6 counts one time of cleaning. When the liquid in the tank further rises and reaches the full liquid level $L_1$, the cleaning liquid overflows the overflow portion 18 of the discharging pipe line 16, and the air in the discharging pipe line 16 is discharged out of the outlet 17 with the overflowing waste liquid. Thus, the waste liquid is completely drawn into the discharging pipe line 16 by the difference in level (or height) between the full liquid level $L_1$ in the cleaning tank 1 and the outlet 17 of the discharging pipe line 16, thereby the liquid level in the tank becomes zero.

However, since the cleaning liquid is successively fed from the feeding pipe line 8, the liquid level in the tank begins to rise again. The above-described process is repeated thereafter in the same way.

In this manner, each time the liquid level in the tank rises (corresponding to one time of pipet cleaning), the counter 6 counts the signal detected by the sensor 4. When reaching the established number of cleaning times, the electromagnetic valve 10 is closed to shut off the feeding pipe line 8.

Since the liquid detection level $L_2$ of the sensor 4 is lower than the full liquid level $L_1$, the liquid does not rise over the level $L_2$ by the actuation of the electromagnetic valve 10, i.e., the cleaning liquid does not overflow the overflow portion 18, and accordingly the cleaning liquid is kept at the level near the full liquid level $L_1$ to automatically stop the pipet cleaning operation at this state.

Since the required number of pipet cleaning is freely selected (or preset) by the dial 14 of the counter 6, the number of cleaning times is variable.

Even when using the conventional pipet cleaning tank, it is possible that the above-described automatic cleaning is achieved by mounting the sensor 4 and the counter 6 thereon. In such a case, it is also preferred that the sensor 4 be fixed to the clip-shaped hanger 5 and that the hole 13 be provided on the counter 6 as shown in FIG. 2 and FIG. 3 respectively so as to easily mount these members on the conventional pipet cleaning tank.

In addition, it is possible to attach an annuciator or indicator as a buzzer, or lamp to provide a signal at the time of closing the electromagnetic valve 10, i.e., when completing a specified number of cleaning times.

Figure 4:
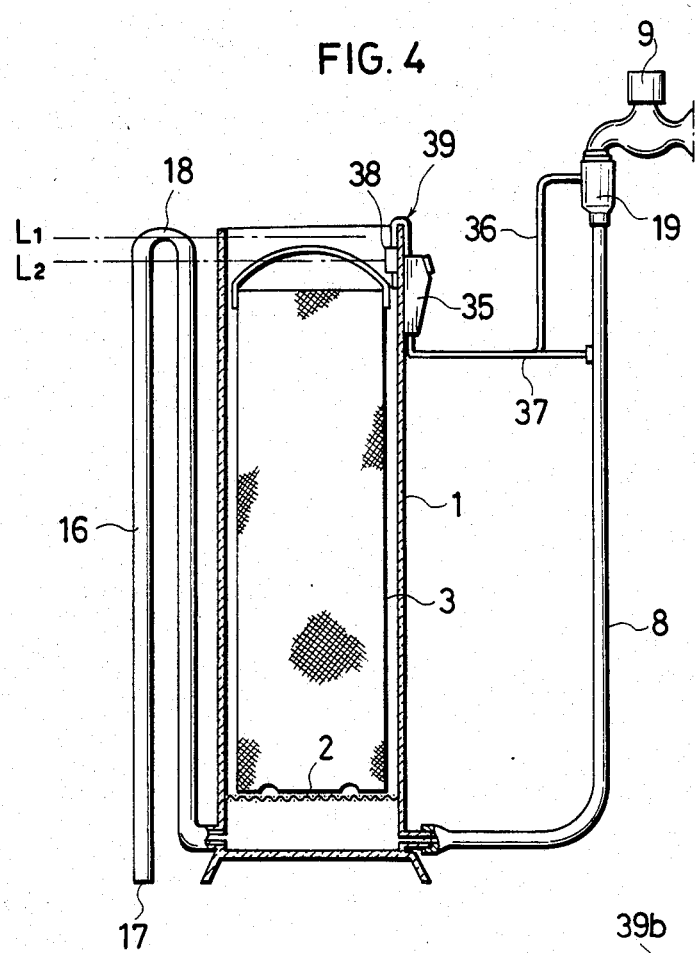
FIG. 4 is a partial sectional view according to a second embodiment of the invention showing the outline of a pipet cleaning apparatus.
Figure 5:
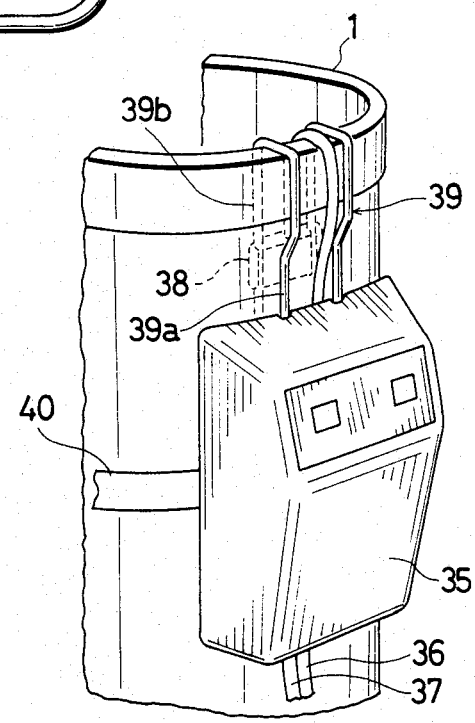
FIG. 5 is an enlarged perspective view of the mounting area of the control box of FIG. 4.

FIGS. 4 to 6 show another embodiment of this invention, in which a valve unit comprising a diaphram valve 19 and a pilot valve 20 are used in place of the electromagnetic valve 10.

With respect to the structure of the diaphram valve 19, a mouth ring 21 is fixed to a faucet 9a of the cock 9 by a set screw 22. A joint sleeve 23 is screwed in the mouth piece 21 from below for engagement therewith, and the periphery of the end of the faucet is sealed by a rubber packing 24 mounted inside of the joint sleeve 23. A cylindrical valve box 25 is further screwed in the joint sleeve 23 from below for engagement therewith. A valve chest 26 is formed in the valve box 25 so as to expand outwardly at a level approximately the middle of the overall height of the valve box 25; a diaphram valve plug 27 is vertically mounted on said valve chest 26. In addition, a transverse wall or bulkhead 28 facing the diaphram valve plug 27 is projectingly provided from the opposite wall. The cleaning liquid passes through a liquid passage 29 formed inside of the joint sleeve 25, flows into the valve chest 26 from the inlet 30 above the bulkhead, and pushes or presses the diaphram plug 27 by water pressure so that the outlet 31 under the bulkhead 28 is opened. An aperture 32 is provided on the diaphram plug 27 at the part corresponding to the inlet 30, so that a back pressure chamber 33 at the back side of the valve member is communicated with the inlet 30. The aperture 32 is sufficiently smaller in diameter than the liquid passage 29.

The pilot valve 20, which is closed by the signal output from a counter 34, is incorporated in a control box 35 together with the counter 34, as shown in FIG. 5. The back pressure chamber 33 is connected with an inflow port 20a of the pilot valve 20 by way of a pilot passage 36 comprising a tube, for example. Further, an outflow port 20b of the pilot valve 20 is connected with the feeding pipe line 8 by way of a drain passage 37 comprising a tube, for example, and both the passages 36, 37 are communicated or shut off from each other by means of the pilot valve 20. Each diameter of the said passages 36, 37 is sufficiently smaller than that of the feeding pipe line 8.

A hanger 39 for mounting a sensor 38 and the control box 35 on the cleaning tank 1 is made of a bar member which is bent in the shape of a clip, being different from the hanger 5 of FIG. 2. The control box 35 is hung on one leg portion 39a of the hanger 39, while the sensor 38 is mounted on the other leg portion 39b so as to be slidable up and down. Thus the liquid detection level $L_2$ is varied by sliding the sensor 38. In this connection, numeral 40 is a belt for fastening the control box to the cleaning tank 1.

In FIG. 6, when the pilot valve 20 is open, the cleaning liquid flows sequentially through the inlet 30, the aperture 32, the back pressure chamber 33, the pilot passage 36, the pilot valve 20, the drain passage 37 thus reaching the feeding pipe line 8, while pushing the diaphram valve plug 27 to be opened, as indicated by the solid line of FIG. 6, and reaching the cleaning tank 1 through the outlet 31.

When final cleaning is completed and the pilot valve 20 is closed by the signal output from the counter 34, the flow of cleaning liquid through the pilot passage 36, and the pilot valve 20 reaching the drain passage 37 is shut off. Accordingly, the back pressure in the back pressure chamber 33 rises, the diaphram valve plug 27 is pushed against the liquid pressure to close the outlet 31 as indicated by broken line of FIG. 6., thus shutting off the feeding pipe line 8.

Figure 8:
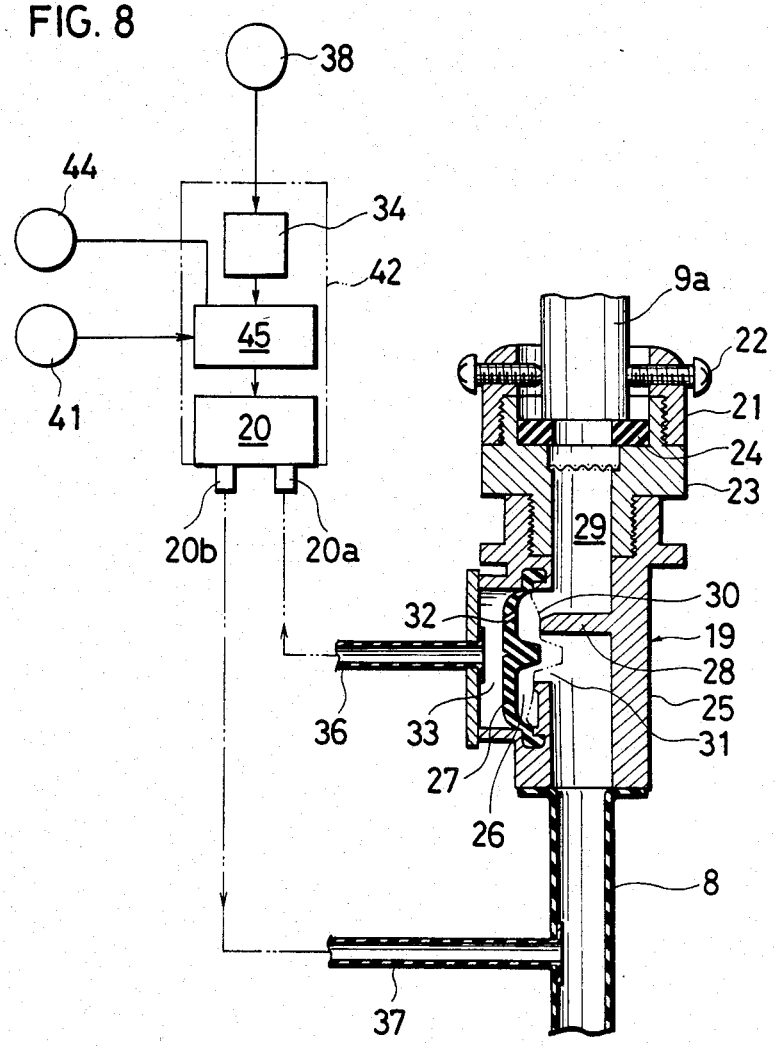
FIG. 8 is an enlarged perspective view of a diaphram valve of FIG. 7.
Figure 9:
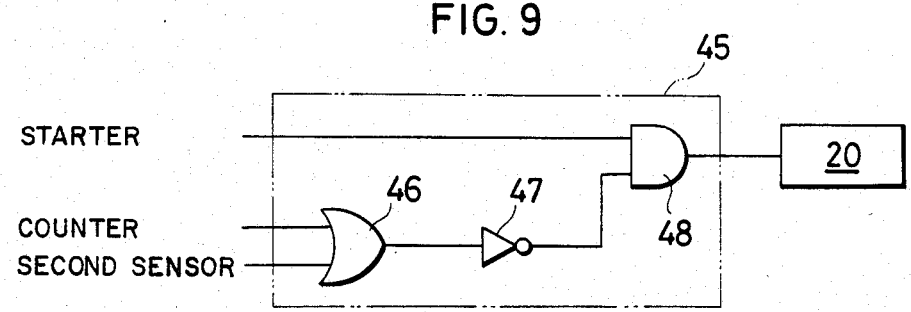
FIG. 9 is a circuit diagram showing an example of the control circuit.

In FIGS. 7 to 9, a further embodiment is illustrated, including a sensor 38 for detecting the liquid level in the cleaning tank 1 to be a first sensor. Another sensor is mounted on the outlet 17 of the discharging pipe line 16 as a second sensor 41 which detects the overflown waste liquid.

In addition to the counter 34, to which the signal detected by the first sensor 38 is input, and the pilot valve 20, a control circuit 45 is accommodated in the control box 42. To the control circuit 45, on-off signals of the starter 44, the output signal of the counter 34 and the detected signal of the second sensor 41 are input respectively.

FIG. 9 shows one mode of the control circuit 45 having therein an OR gate element 46 to which respective signals of the counter 34 and the second sensor 41 are input, a NOT gate element 47 for inverting the output of the element 46, and an AND gate element 48 to which respective outputs of the NOT gate element and the starter 44 are input.

The circuit 45 of FIG. 9 is operated as described below. When switched "ON" the starter 44 for starting the cleaning, one input terminal of the AND gate element 48 comes to a level "H". Since the outputs of the counter 34 and the second sensor 41 are at level "L" respectively, the output of the OR gate element is also at the level "L", while the output of the NOT gate element 47 is at the level "H". Accordingly, the other input terminal of the AND gate element 48 comes to the level "H", and the output of the control circuit 45 is also at the level "H", thereby the pilot valve 20 is kept at the open state. When the liquid level in the tank reaches the full liquid level $L_1$ and the waste liquid is drawn into the discharging pipe line 16, the second sensor 41 detects the beginning of overflow and the output thereof comes to the level "H", and the output of the control circuit 45 comes to the level "L", thereby the pilot valve 20 is closed. Accordingly, the flow of cleaning liquid through the pilot passage 36 and the pilot valve 20 reaching the drain passage 37 is stopped, the diaphram valve member 19 is closed, and the feed of new cleaning liquid is stopped, is thereby liquid level in the tank being rapidly lowered.

When the tank becomes empty, the output of the second sensor 41 returns to the level "L" to open the pilot valve 20, and as a result thereof the new cleaning liquid is fed to the cleaning tank 1 by way of the feeding pipe line 8.

In this manner, the counter 34 counts the detected signal everytime the liquid level in the tank rises (corresponding to one time of the pipet cleaning), and when completing the final cleaning and the output of the counter 34 comes to the level "H", the output of the control circuit 45 turns to level "L" so that the pilot valve 20 is closed to shut off the feeding pipe line 8.

As is obvious by the foregoing description, when the waste liquid in the cleaning tank 1 begins to overflow to the discharging pipe line 16, the feed of new cleaning liquid to the tank 1 is stopped, and such a state continues up to the completion of discharge. Therefore, there is no longer any wastage such as discharging new cleaning liquid without being used in the pipet cleaning. Furthermore, the time necessary for discharging the waste liquid is exclusively decided by the liquid quantity in the tank at the time of starting the discharge and the discharging speed, resulting in shortening the discharging time.

Referring now to FIG. 10 which shows a further modification, a basket 50 accommodated in the cleaning tank 49 is rotated by the force of the cleaning liquid flowing into the cleaning tank 49. To be more specific, a supporting pin 52 is projectingly provided on the upper side of a supporting plate 51 of the cleaning tank 49, while an engaging pin 54 is projectingly provided on the lower side of a cover 53 for covering the cleaning tank 49. Thus, the basket 50 is supported by the supporting pin 52 at the bottom part thereof, and is rotatable by engaging the pin 54 with an aperture (not shown) provided on the handle 55 of the basket 50. The cleaning liquid is fed from the feeding pipe line 8 to the cleaning tank 49 in a tangential direction, and the basket 50 is forcibly rotated by eddy current produced in the cleaning tank, thereby greatly improving the cleaning effect. The cleaning effect is far more improved when the cleaning tank 49 is placed on an ultrasonic vibrating device 56 to add ultrasonic vibration to the cleaning liquid.

Since there is a possibility that the basket 50 will come in contact with the first sensor and stop the rotation of the basket, when using the rotatable basket 50 as shown in FIG. 10₁ it is preferred that the first sensor be constructed to be thin as shown in FIG. 11. For example, a stainless steel plate of 0.5-1.0 mm in thickness is bent to be a clip-shaped hanger 58. Then an electro-conductive film 50 is adhered onto the hanger 58, and an insulating and water-resistant coating is applied thereto. The insulating and water-resistant coating is then torn off at two optional parts to use the exposed parts of the electro-conductive film as contact points for switching. Thus, being constructed a sensor 57 is constructed which outputs a detected signal when both contact points are short-circuited by the cleaning liquid.

As many apparently widely different embodiments of this invention may be made without departing from the spirit and scope thereof, it is to be understood that this invention is not limited to the specific examples thereof except as defined in the appended claims.

What is claimed is:

1. A pipet cleaning apparatus comprising a cleaning tank for accommodating a pipet, a pipe line for feeding cleaning liquid to said cleaning tank, a siphon-shaped pipe line for discharging used cleaning liquid out of the cleaning tank having an overflow portion at the same level as a full liquid level established in the cleaning tank, a sensor for detecting existence of the cleaning liquid immediately before the cleaning liquid reaches the full liquid level, a counter for counting signals detected by said sensor, and a valve unit of the feeding pipe line to be closed by the signal which is output when a specified number of cleaning times is counted.

2. A pipet cleaning apparatus as set forth in claim 1, wherein said valve unit is an electromagnetic valve.

3. A pipet cleaning apparatus as set forth in claim 1, wherein a pilot valve closed by the signal output from the counter and a diaphram valve closed in association with said pilot valve are incorporated in said valve unit, said diaphram valve is mounted on the feeding pipe line, a back pressure chamber of the diaphram valve and an inflow port of the pilot valve are connected with each other by way of a pilot passage, while the outflow port of the pilot valve and the feeding pipe line are connected with each other by way of a drain passage, and the communication of the pilot passage with the drain passage is shut off by closing the pilot valve.

4. A pipet cleaning apparatus as set forth in claim 3, wherein said diaphram valve has a valve chest communicating with the cleaning liquid passage of the feeding pipe line, the communicating portion is partitioned into an inlet and an outlet by a bulkhead, a diaphram valve plug is disposed in the valve chest so as to open the outlet by the pressure of cleaning liquid flowing from the outlet into the valve chest, the back pressure chamber formed behind the valve plug and the outlet are communicated with each other by way of an aperture provided passing through said valve plug, and the diameter of the aperture is sufficiently smaller than that of the cleaning liquid passage.

5. A pipet cleaning apparatus comprising a cleaning tank for accommodating a pipet, a pipe line for feeding cleaning liquid to said cleaning tank, a siphon-shaped pipe line for discharging used cleaning liquid out of the cleaning tank having an overflow portion of the same level as a full liquid level established in the cleaning tank, a first sensor for detecting existence of the cleaning liquid immediately before the cleaning liquid reaches the full liquid level, a counter for counting signals detected by said first sensor, a second sensor for detecting the starting of overflow of the cleaning liquid, and a valve unit of the feeding pipe line to be closed by the signal which is output when a specified number of cleaning times is counted and by the signal which is detected by the second sensor, respectively.

6. A pipet cleaning apparatus as set forth in claim 5, wherein said valve unit is an electromagnetic valve.

7. A pipet cleaning apparatus as set forth in claim 5, wherein a pilot valve closed by the signal output from the counter and a diaphram valve closed in association with said pilot valve are incorporated in said valve unit, said diaphram valve is mounted on the feeding pipe line, a back pressure chamber of the diaphram valve and an inflow port of the pilot valve are connected with each other by way of a pilot passage, while the outflow port of the pilot valve and the feeding pipe line are connected with each other by way of a drain passage, and the communication of the pilot passage with the drain passage is shut off by closing the pilot valve.

8. A pipet cleaning apparatus as set forth in claim 7, wherein said diaphram valve has a valve chest communicating with the cleaning liquid passage of the feeding pipe line, the communicating portion is partitioned into an inlet and an outlet by a bulkhead, a diaphram valve plug is disposed in the valve chest so as to open the outlet by the pressure of cleaning liquid flowing from the outlet into the valve chest, the back pressure chamber formed behind the valve plug and the outlet are communicated with each other by way of an aperture provided passing through said valve plug, and the diameter of the aperture is sufficiently smaller than that of the cleaning liquid passage.

9. A pipet cleaning apparatus as set forth in claim 5, wherein said valve unit is controlled by an electric control circuit to which signals output from the counter and signals detected by the second sensor are input, and so long as the signal output from the counter at the time of counting a specified number of cleaning time is not input to said electric control circuit, the valve unit is reopened by erasing the signal detected by the second sensor.

* * * * *